Nov. 10, 1942.    A. GRAF    2,301,396
GRAVITY METER
Filed April 6, 1938    3 Sheets-Sheet 1

Inventor:
Anton Graf
By A. D. Adams
Attorney.

Nov. 10, 1942.  A. GRAF  2,301,396
GRAVITY METER
Filed April 6, 1938  3 Sheets-Sheet 3
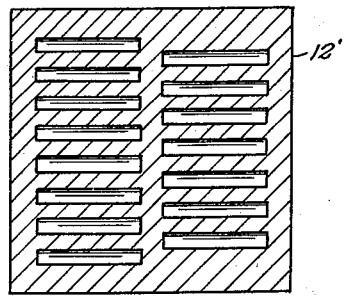
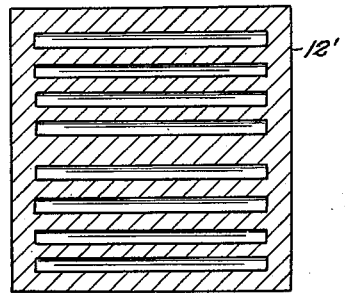
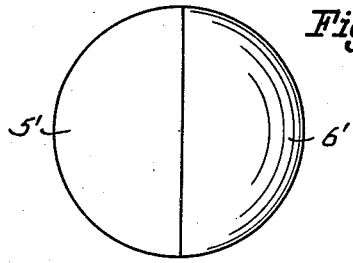
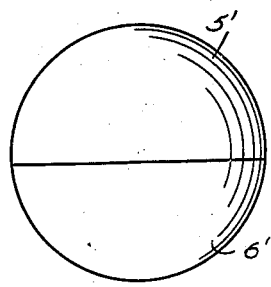
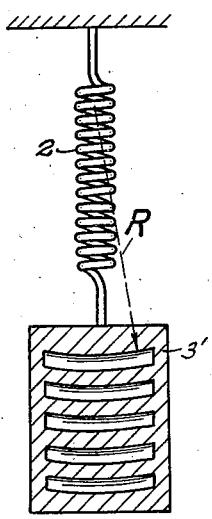
Inventor:
Anton Graf
By A. D. Adams
Attorney.

Patented Nov. 10, 1942

2,301,396

UNITED STATES PATENT OFFICE 2,301,396

GRAVITY METER

Anton Graf, Berlin-Steglitz, Germany; vested in the Alien Property Custodian

Application April 6, 1938, Serial No. 200,539
In Germany March 17, 1937

4 Claims. (Cl. 265—1.4)

This invention relates to improvements in gravity meters, more particularly of the class in which the force of gravity is balanced by spring means.

In such gravity meters the vertical displacement of a mass balanced by the spring means is a measurement of the force of gravity. However, the vertical displacement of the mass is usually so small that a direct observation is not possible. Therefore, trials and experiments of all kinds have been made in order to magnify the displacement of the mass itself by means of transmitting systems.

The principal object of the invention is to provide a transmitting system which is relatively simple and which will at the same time meet the rigid requirements with regard to extreme indicating sensitiveness. The invention is based on the principle of converting the vertical displacements of the mass balanced by spring means into electrical values by means of an optical-electric transmitting system, said electrical values being a measurement of said vertical displacements.

The invention still further aims to provide a transmitting system which operates correctly even in the case in which the gravity meter is inclined relative to the vertical axis, thereby materially simplifying the practical use of the meter.

Furthermore, according to the invention, optic-electrical cells such as ordinary selenium cells, may be arranged in differential connection so that only the differential current or differential voltage resulting from the displacement of the mass will be indicated. In this manner, only the small differential currents act on the indicating instrument so that a small measuring range of the indicating instrument will be sufficient for extreme indicating sensitiveness.

Other objects and advantages of the present invention will hereinafter be more fully explained with reference to the accompanying drawings representing some embodiments of the invention by way of example only.

Figs. 3 to 7 inclusive, are views of some details of the transmitting system.

Figure 1:
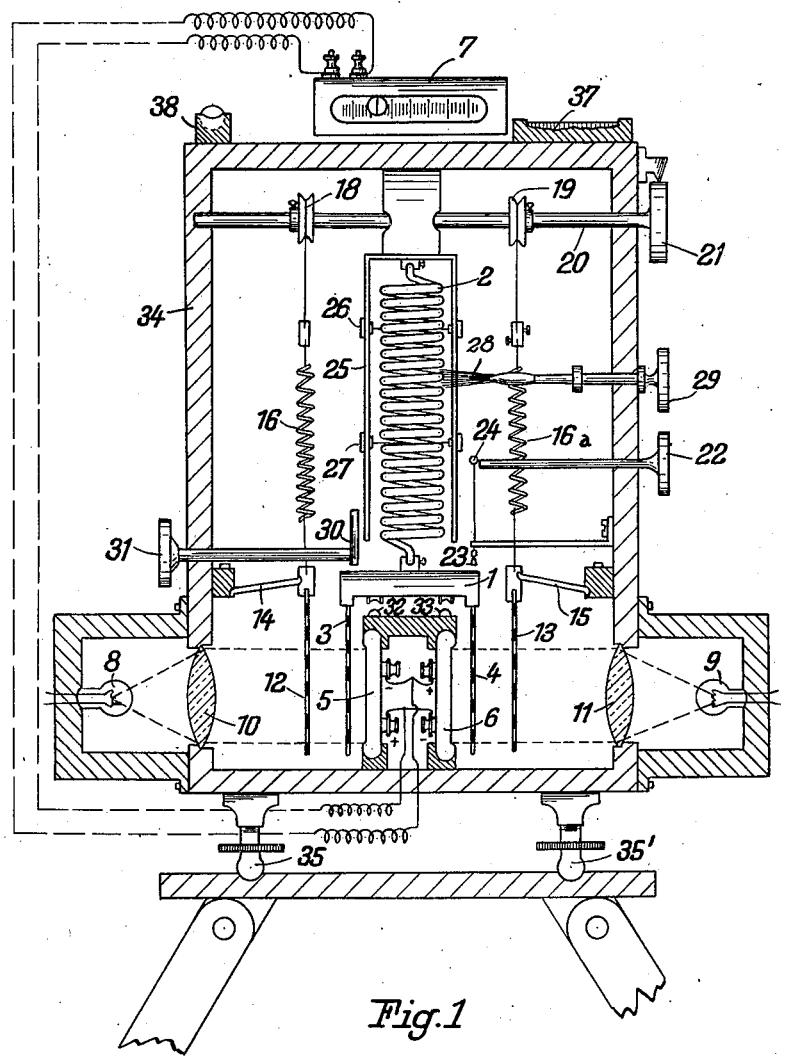
Fig. 1 is a vertical sectional elevation of a gravity meter embodying the invention.

Referring now to the drawings, according to Fig. 1, a mass 1 in the form of a block is suspended by a helical spring 2, the upper end of which is fastened to a supporting member supported by the casing 34. To the lower side of the mass 1 are attached two grid-like diaphragms 3 and 4, respectively, having a plurality of slits as shown in Figs. 3, 5, 7. Between these two diaphragms are arranged two photo-cells such as selenium cells, 5 and 6, respectively. The connection of said cells with reference to each other and to a galvanometer 7 is illustrated in Fig. 1. Sources of light 8 and 9 are mounted at both sides of the casing 34. Two lenses 10 and 11 are provided so that the rays passing said diaphragms 3 and 4 are parallel. Between said lenses 10 and 11 and said diaphragms 3 and 4 two diaphragms 12 and 13, respectively, are suspended from leaf springs 14 and 15, respectively, so as to enable a vertical adjustment of said last named diaphragms by means of helical springs 16 and 16a respectively. These springs are connected at one end to said diaphragms 12 and 13 respectively, and the other ends are fastened to pulleys 18 and 19, respectively. A shaft 20 supporting said pulleys is rotatably mounted in the casing 34. By means of a knob 21 said shaft may be turned, thereby effecting the vertical adjustment of the diaphragms 12 and 13. The helical springs 16 and 16a are weak as compared with the leaf springs 14 and 15 in order to enable only a small displacement of the diaphragms upon a relatively great adjustment of the knob.

The operation of the gravity meter is as follows:

It may be assumed that the gravity decreases so that the mass 1 rises due to the force of the main spring 2. At the same time the diaphragms 3 and 4 rise and are thus displaced with reference to the fixed diaphragms 12 and 13, thereby causing a change in the quantity of light passing from the sources of light 8 and 9 to their respective cells 5 and 6. Obviously, a change in quantity of light results in a change of the current or of the voltage in the circuit of the cells which is indicated by the galvanometer 7.

According to the connection, as shown in Fig. 1, the cells 5 and 6 are connected in opposition to each other; so that the difference between the currents or the voltages of the two cells acts on the galvanometer 7. It is to be noted that the connection of the two cells 5 and 6, as shown in Fig. 1, is not identical with a short circuit, because the resistance of the illuminated cells is about ten times as great as the resistance of the galvanometer 7. The potential difference between the galvanometer leads, when the cells are exposed to different amounts of light, is due to the fact that the internal resistance of each cell is inversely proportional to its voltage.

If the entire instrument inclines against the vertical axis, the mass 1, the diaphragms 3 and 4 and the diaphragms 12 and 13 are laterally displaced with reference to the cells 5 and 6. Through such a lateral displacement a change in quantity of light may be caused without any change of the gravity force, i. e., without any change of the vertical position of the mass. This disadvantage should be avoided so as to have an insensibility of the gravity meter against lateral inclination. For this reason the slits of the diaphragms 3 and 12 or 4 and 13 are of different length so that the quantity of light passing through the slits is in no way influenced by said lateral displacement of the diaphragms resulting from an inclination of the entire instrument.

In order to further reduce the influences of inclination on the exactness of indication the slits of the diaphragms may be curved like a circular arc as embodied in the diaphragm 12a for instance in Fig. 7, the arc having a radius R equal to the oscillating radius of the lateral displacement upon a lateral inclination.

When the cells are connected as shown in Fig. 1, it is necessary to arrange the diaphragm pairs 3, 12 and 4, 13 in such a manner that upon a change of the gravity force the quantity of light reaching the cells increases on one side and decreases on the other side. If in this case the two cells 5 and 6 are connected in the manner according to Fig. 1, a doubling of the change in current or voltage is obtained thereby doubling the sensitiveness of the instrument. Furthermore, in this way a change in the intensity of light of the two sources 8 and 9 fed by one source of current does in no way influence the indicating exactness and only immaterially influences the indicating sensitiveness, contrary to a transmitting system comprising only one source of light and one cell. In this case, of course, a change in the intensity of light influences the indicating adjustment and, therefore, likewise the indicating exactness. In case two cells are used they will operate together like the variable resistances in a Wheatstone bridge. Therefore, the galvanometer readings will not be materially affected by changes in the light current. Only the sensitiveness is influenced by changes in the light current.

Furthermore, it is important that the double system as shown in Fig. 1 also guarantees a certain insensibility against lateral inclinations of the entire instrument in the drawing plane. If for instance the instrument is inclined towards the left against the vertical line, the distance between the two diaphragms 3 and 12 has become smaller and the distance between the two diaphragms 4 and 13 has become larger. This change in the distance of the diaphragms to each other results in a change of the quantity of light reaching the cells in the sense that, for instance the diaphragms 3 and 12 release a greater quantity of light and the diaphragms 4 and 13 a smaller quantity without changing, however, the sum of the separate quantities of light and, therefore, the total indication. A certain insensibility against an inclination transverse to the drawing plane according to Fig. 1 is guaranteed as above explained by using diaphragms as shown in Fig. 7. In view of the extreme indicating sensitiveness it is necessary to operate with a small range of measurement so that it is preferable to take care that the zero-point may be adjusted within large ranges in order to be able to adapt the instrument to the existing field conditions. For this purpose the elastic suspension of the diaphragms 12 and 13 is provided, whose common displacement relatively to the diaphragms 3 and 4 and the mass 1 has the same effect as a displacement of the mass 1 resulting from a change in the force of gravity to be measured. The insertion of the weak screw springs 16 and 16a enables as explained above a highly sensitive displacement of the diaphragms 12 and 13. It may be noted in this respect that in most cases the adjustment of the diaphragms 12 and 13 amounts to only a few hundredths of a millimeter.

Faults may arise from the photo-electric system and more particular from the use of incandescent lamps, whose luminous intensity may change due to any change in voltage of the sources feeding said lamps. Such irregularities cannot cause a faulty indication if a calibrating device is provided comprising a small extra weight 23 which may be set on the mass 1 by means of a handle 22 on the shaft of which an extra weight is eccentrically suspended as at 24. The calibrating value of the gravity meter is determined by the ratio of the mass 1 and half of the main spring 2 to the extra weight 23. Therefore, a fault cannot arise in this manner of measurement as the calibration may be repeated as often as desired.

When transporting the gravity meter, the main spring 2 may be set in strong vibrations which would result in a disturbing elastic after-effect. Means are provided to limit the amplitudes of oscillation of the spring in the different directions and to calm the spring after the apparatus has been set down on the earth. These means comprise a tube 25 and a plurality of threads 26 and 27 which are stretched in said tube and distributed as equally as possible over the length of the main spring 2. As shown in Fig. 1, the threads lie between the coils of the spring 2 so that the single coils have only a very small stroke. A brush 28 is arranged on the inner end of a rod axially movable in the casing 34 and having at its outer end a handle 29 adapted to push in or pull out the rod. A hole in the tube 25 permits the passage of the brush 28 so that in the operative position as shown in Fig. 1 the ends of the brush hairs barely touch the coils of the inner spring 2, thereby immediately damping the harmonic oscillation of the spring.

For transporting the gravity meter it is advisable to lock the mass 1. According to the embodiment shown in Fig. 1, there is a locking disc 30 excentrically mounted on a shaft which may be turned by a knob 31 to engage said disc with the mass 1 and to press it down on stops 33 and 32. At the same time by this locking operation the sensitivity of the photo-cells may be examined if desired. If, for instance, the current of the photo-cells changes, due to a diminution of the lamp current or to a blackening of the lamps, then this may be seen from the changed indication of the galvanometer 7 in the locked position of the mass 1.

Of course, beside said brush or in place of it a damping device of any other kind for instance of the electromagnetic type may be provided. Furthermore in place of the weak helical springs 16 and 16a connected to the diaphragms 12 and 13 one or more springs may be provided which are attached to the mass 1 so that the diaphragms 12 and 13 may be rigidly connected to the casing 34.

The entire arrangement is enclosed in the casing 34 having thick walls and being provided with adjustable foot screws 35 and 35' and two liquid levels 37 and 38 adapted to level the instrument in a wellknown manner. A protecting thermostat cover surrounds the gravity meter to keep the temperature in a well known manner constant within the casing 34.

In the modification shown in Fig. 2 the two photo-cells are not arranged side by side, but one below the other so that only one pair of diaphragms 3', 12' and only one source of light is necessary. The operation of the transmitting system is principally the same as in the case of Fig. 1. As both the cells 5 and 6 belong, according to Fig. 2, to the same source of light, any influence of changes in light intensity will be still further reduced. In order to be able to observe and to examine even more exactly the influence of the changes in light intensity on the sensitivity, an auxiliary cell 40 is so arranged that it receives light from the same source as the main cells 5 and 6. The auxiliary cell 40 is connected to an auxiliary galvanometer 39 indicating the calibrating current of the cell 40. In this manner the brightness of the source of light and the calibrating value of the gravity meter may be examined at any time from outside.

Figure 2:
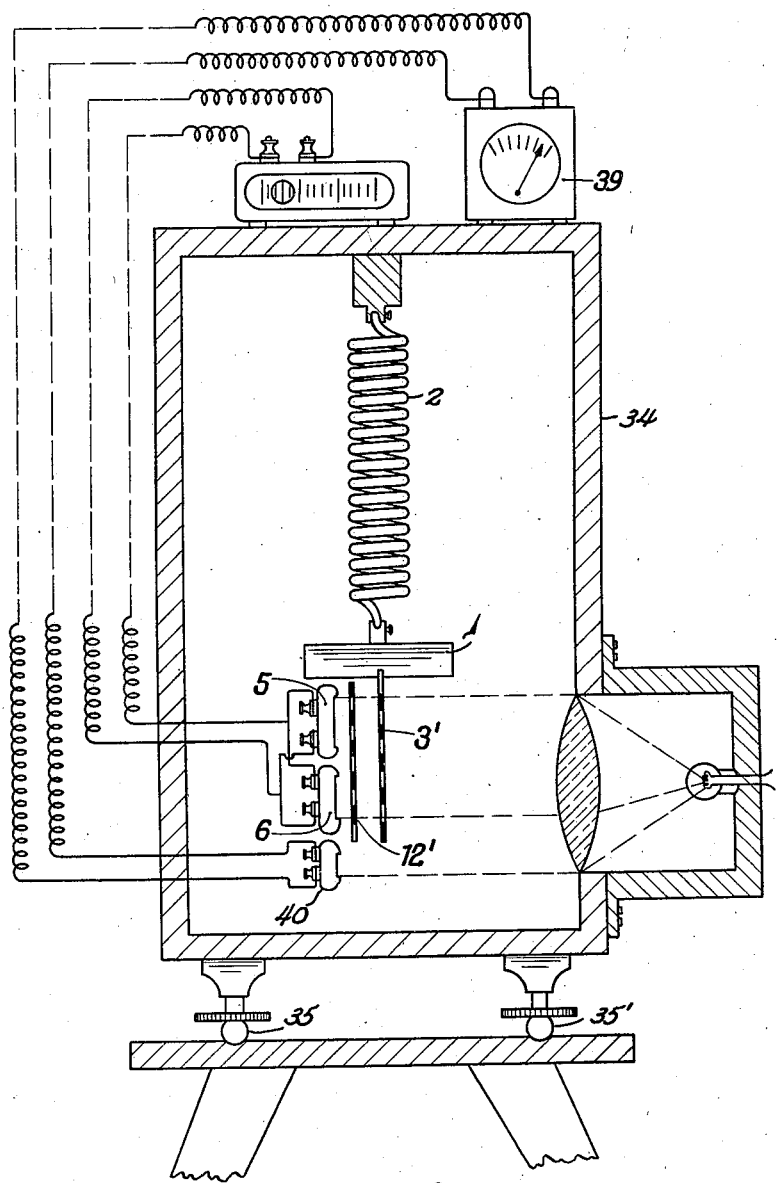
Fig. 2 is a vertical sectional view of a modified form of gravity meter.

The embodiment in Fig. 2 may be modified by using a differential photo-cell as shown in Figs. 4 and 6 in place of the two cells of Fig. 2. The differential cell is so constructed that a photosensitive plate is divided into semi-circular like parts 5' and 6' held in the same frame and acting in the same manner as two cells in separate frames. When using a differential cell shown in Fig. 4, the diaphragm 3' of Fig. 2 may remain unchanged, whilst the slits of the diaphragm 12' are to be formed according to Fig. 3. If, on the other hand, the differential cell has a horizontal dividing line according to Fig. 6, the diaphragm 12' (Fig. 2) is to be formed according to Fig. 5.

It is to be noted that the present invention is not restricted to the particular embodiments shown and described. Many other modifications besides those explained above may be made without departing from the spirit of the invention, the particulars of which are defined in the following claims.

What is claimed is:

1. A gravity meter comprising, in combination, a mass mounted for displacement in vertical direction, springs means balancing the gravity force of said mass, an optic-electric cell system adapted to transform light variations into electric values, indicating means operatively connected to said cell system, to indicate said values, a first diaphragm having apertures for permitting the passage of light so as to fall on said cell system, said first diaphragm being arranged to be displaced with said mass, a second diaphragm having apertures for permitting the passage of light, said second diaphragm being fixedly mounted so that upon displacement of said first diaphragm with reference to said second diaphragm the quantity of light reaching said cell system will be changed, the apertures of said first and said second diaphragm being elongated and extending transverse to the direction of the displacement of said mass, the elongated apertures of one of said diaphragms being longer than the apertures of the other so as to avoid a change in the quantity of light reaching said cell system by any lateral displacement of said first diaphragm with reference to said systems due to an inclination of the gravity meter against the vertical line.

2. A gravity meter comprising, in combination, a mass, a spring means for suspension of said mass so as to balance the gravity force of said mass, an optic-electric cell system adapted to transform light variations into electric values, indicating means operatively connected to said cell system to indicate said electric values, a first diaphragm having elongated apertures extending substantially in horizontal direction for permitting the passage of light so as to fall on said cell system, said first diaphragm being arranged to be displaced with said mass upon a change in the gravity force, a second diaphragm having elongated apertures for permitting the passage of light, said second diaphragm being arranged to remain stationary relative to said system during the measuring operation so that upon displacement of said mass and said first diaphragm relative to said second diaphragm the quantity of light reaching said cell system will be changed, the elongated apertures in said first and said second diaphragms being curved according to the radius extending through the fictive pivot point of suspension of said mass so as to avoid a change in the quantity of light reaching said cell system by any lateral displacement of said first diaphragm with reference to said cell system due to an inclination of the gravity meter against the vertical line.

3. A gravity meter comprising; in combination, a mass mounted for displacement in vertical direction, spring means balancing the gravity force of said mass, a source of light, a main optic-electric cell system adapted to transform variations of light coming from said source into electric values, indicating means for indicating said values, light controlling means arranged to be displaced by said mass for varying the quantity of light reaching said main cell system in response to the vertical displacement of said mass, an auxiliary optic-electric cell system arranged to receive a constant quantity of light coming from said source so as to produce an auxiliary indicating value for indicating any change in light intensity and thereby checking the sensitivity of the first named cell system.

4. A gravity meter comprising, in combination, a mass mounted for displacement in vertical direction, spring means balancing the gravity force of said mass, an optic-electric cell system for transforming the light variations into electric values, said system including two cell units arranged in differential connection, a first light controlling means for one of said units and a second light controlling means for the other of said units, said first and said second light controlling means being arranged to be displaced by said mass in such a manner that upon a displacement of said mass, the quantity of light reaching one of said cell units increases and at the same time the quantity of light reaching the other of said cell units decreases, a source of light common to both cell units, indicating means operatively connected to said cell units so as to indicate the difference of the measuring values of said two units, and an auxiliary optic-electric cell system arranged to receive a constant quantity of light coming from said source so as to produce an auxiliary indicating value for indicating any change in light intensity.

ANTON GRAF.